S. R. PARKHURST.
Cotton Seed Extractor.
No. 6,703.
2 Sheets—Sheet 1.
Patented Sept. 11, 1849.
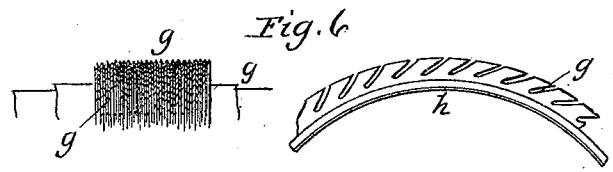
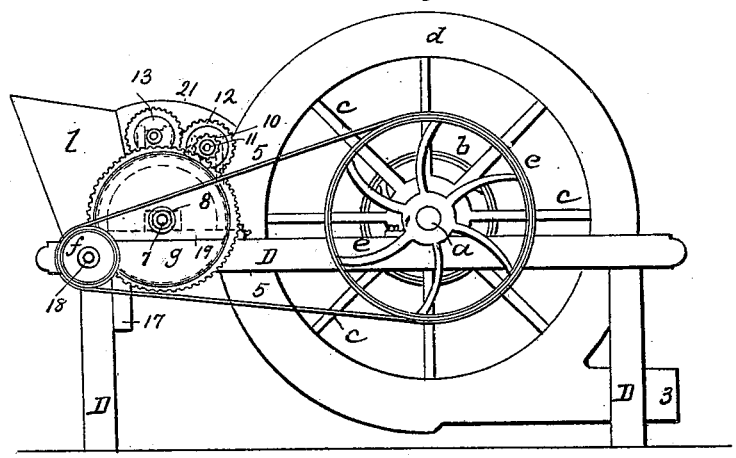

S. R. PARKHURST.
Cotton Seed Extractor.
No. 6,703.
2 Sheets—Sheet 2.
Patented Sept. 11, 1849.
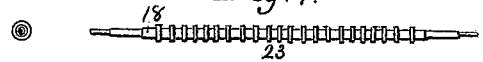
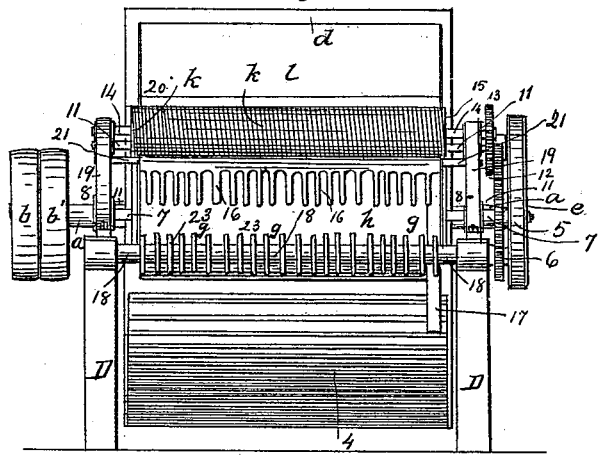
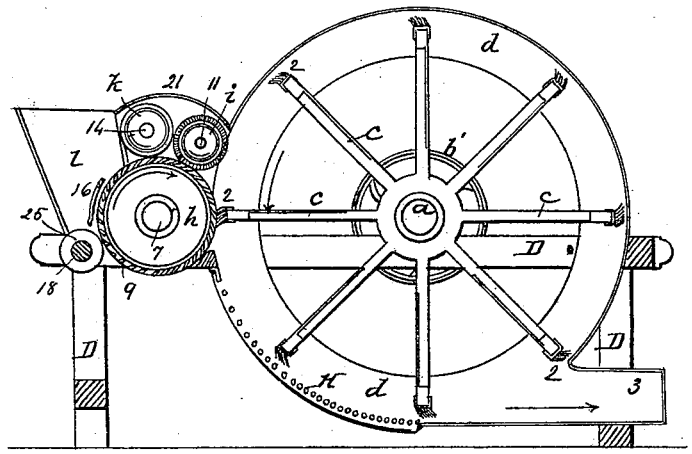
Witnesses:
Inventor:

UNITED STATES PATENT OFFICE.

STEPHEN R. PARKHURST, OF NEW YORK, N. Y.

IMPROVEMENT IN COTTON-GINS.

Specification forming part of Letters Patent No. 6,703, dated September 11, 1849.

*To all whom it may concern:*

Be it known that I, STEPHEN R. PARKHURST, of the city of New York, have invented a new and useful machine for separating cotton from its seeds without injury to the fibers, which I term "Parkhurst's Cotton-Seed Extractor," and for which I seek Letters Patent of the United States; and I do hereby declare that the following is an accurate description thereof, reference being had to the drawings annexed to and making part of this specification, wherein—

Figure 1 is a general plan. Fig. 2 is a side elevation, as on the side A of Fig. 1. Fig. 3 is a sectional elevation through the line B C of Fig. 1; and Fig. 4 is an end elevation, as with the front of the feeding-hopper removed at the end of B Fig. 1.

The same letters and numbers apply to like parts in all the figures as marks of reference.

In these figures D is the main frame, shown as of wood, but may be made of any other suitable material. *a* is the main shaft in bearings 1, with the fast and loose drums *b b'* on the opposite side to A, Fig. 1, to connect to the power and carry within the frame the blower *c*, having cards on the ends of the arms. These cards are shown in Fig. 3 as made with wire card-teeth. The blower is surrounded by the case *d*, having an exit-mouth, 3, to pass out the cotton, and a grating, 4, at the bottom to pass out through into an inclosure below it, which prevents the loss of any blast from the blower. On the side A, Fig. 1, the end of the shaft *a* carries a drum-wheel, *e*. This is connected by a belt, 5, to a smaller drum, *f*, attached to a shaft, 18, passing through and with bearings in the frame. On this shaft is the pinion 6, which gears into a spur-wheel, *g*, on a shaft, 7, in bearings 8, that are supported in a metal standard, 19, fitted on the frame D, as shown in Fig. 1, and by red lines in Fig. 2, as behind the wheel *g*. The shaft 7 carries the cylinder *h*, which cylinder is best made as a hollow cylinder having on it metal rings with hooked teeth 9 9, cut into their outer edges and made with a beveled edge on each side of the teeth, to admit placing the rings close together, and yet leave the points of the teeth clear of each other laterally, as shown in Fig. 6; but this cylinder may be made by having the rings of teeth set upon a solid shaft or cylinder, or it may be constructed in any other way with a surface of teeth producing the effect herein described. The spur-wheel *g* gears into a pinion, 10, on a shaft, 11, also sustained in bearings on the standard 19. The shaft 11 carries a cylinder, *i*, made as a fancy card-cylinder. Between the pinion 10 and the standard the shaft 11 carries a larger pinion, 12, gearing into a pinion, 13, on shaft 14, also in bearings on the standard 19. This shaft 14 carries the cylinder *k* with a screw-formed surface, which cylinder may be made as a tube of metal with wire closely wound round it, so that the wire forms an entire regular screw-thread on the surface of the cylinder. This cylinder may also be formed by turning or working the surface of a solid shaft into the form of a screw or helix, or in any other manner having the surface so formed as to act upon the cotton and cotton-seeds, substantially as herein described. A second mode of driving these parts is shown in Fig. 1 by red lines, that indicate the drum *e* as placed between the pulley *b* and the frame, with the belt 5 to a drum on this end of the shaft 11, the pulley *f* removed, but the other parts remaining as described. The same effect will take place in the relative direction and speed of rotation of all the other parts.

Attached to the shaft 18 is a series of collars or plates, 23, at a distance of about three-quarters of an inch or an inch apart and, say, from three to five inches in diameter. This shaft, with collars or plates on it, is shown by the detached Fig. 7, and is placed in front of the cylinder *h*, at the bottom of the hopper, and rotates in a direction opposite to that of the cylinder *h*, to keep the cotton in the hopper loose and free to pass upon the cylinder *h*. In front of the cylinder *h* may be placed, in any convenient manner, ribs or fingers 16, to regulate the feeding of the cotton upon the cylinder *h*. In front of the cylinder *h* is placed a hopper, *l*, attached to the frame in any convenient manner, in which the cotton is placed to be fed upon the cylinder. At the end of cylinder *k*, toward which the cotton-seeds are moved by its screw-surface, may be placed a plate, 15, with the edge adapted to the form of and placed near to, but not quite touching, the cylinder *k*, so as to arrest the lateral progress of the seeds and cause them to drop down into a tube or raceway, 17, to conduct the seeds away.

Fig. 5 shows in the lower part the proportionate sizes of the cylinder $h$ compared with the sizes of the cylinder $k$, as being in their diameters nearly as three to seven inches each, and when larger in the like proportions, and the relative speed of the several parts should be that while a card on the card-wheel $c$ travels four feet a point on the circumference of the cylinder $h$ should travel only one foot, the faces of both rotating in the same direction, as shown by the arrows on them. In like manner a point on the circumference of the cylinder $k$ should travel four feet while a point on the surface of the cylinder $h$ travels only one foot. These cylinders rotate in the same direction, and a point on the surface of the fancy cylinder $i$ should also travel four feet while a point on the cylinder $h$ travels one foot. The fancy cylinder $i$ and cylinder $h$ rotate in the opposite directions, and the fancy cylinder $i$ and gear-wheel rotate in the same direction, all as shown by the arrows on them.

The parts being adjusted, as described, and put into operation, the cotton and seeds to be separated are placed in the hopper $l$, which slides down until it comes in contact with the collars or plates 23, and also with the cylinder $h$. The said collars or plates rotating keep the cotton loose and free, while the teeth of the cylinder $h$, taking hold of the fibers of the bolls of cotton, draw the bolls with the seeds forward until they come in contact with the cylinder $k$. This cylinder, rotating in the same direction, and having a screw-formed surface, in conjunction with the cylinder $h$, gives the bolls of cotton containing the seeds two motions at the same time, namely, one being a rolling motion caused by the two cylinders rotating in the same direction while the bolls are held close in contact with each cylinder, and the other motion being a lateral one, caused by the screw-formed surface of the cylinder $k$.

It will now be observed that by the rotation of the bolls of cotton on the surface of the cylinder $h$, all parts of the boll are successively brought into contact with and exposed to the action of the teeth. This enables the teeth to gradually remove the cotton from the seed by taking hold of only the outside fibers of the boll until the boll, which covers the seed, has become so thin that the lateral pressure upon it by the screw-surface of the cylinder $k$ crowds the seed out, when the seed either drops down or is moved laterally along until, coming in contact with the plate 15, it falls into the raceway 17. The cotton thus separated from the seeds is carried forward by the teeth of the cylinder $h$, under the cylinder $k$, and, being loosened up by the action of the fancy cylinder $i$, is removed by the cards $a$ of the blower $c$, which blower causes a current of air sufficient to remove the cotton from the said cards and convey it out through the opening 3 into any convenient receptable. The grating 4 is to admit any dust or fine dirt to fall through it.

It will further be observed that by the bolls of cotton being rolled upon the cylinder $h$, so that its teeth remove successively and gradually the outside fibers, the staple is preserved from being broken, torn, and injured, as it would be if the teeth either took a deeper hold, so as to tear the boll in two by the first pull, or continued to take hold of and remove the fibers from one side only until the seed should become developed on that side, and also prevents the cotton from becoming napped or knotted in the process of cleaning, as is done by the machines now in use; and, also, that by this machine any pods will also be separated from the cotton and pass off with the seeds, and not be broken and passed into the cotton, as they are by the machines now in use.

The fancy cylinder $i$ may, with some species of cotton, be dispensed with; and though the several proportions of sizes and speed of motion above mentioned are such as I in practice have found best, I do not mean to be limited thereto, but to vary the same according to the growth, quality, or condition of the cotton operated upon.

Any suitable cover, as 21, may be fitted over the cylinders $h$ and $k$, to secure them and the cotton operated upon from dirt.

Having thus described my invention and its operation, what I claim as my invention, and desire to secure by Letters Patent, is—

The combination of the toothed cylinder $h$ with the screw-cylinder $k$, both having their outer surface formed substantially as described, and working together in the manner and for the purpose above set forth.

I am aware that toothed cylinders have heretofore been essayed in connection with grooved rollers for ginning cotton; but when this has been done the grooves have been made directly around the cylinder, or if spiral have been arranged in lines so nearly parallel with the axis of the cylinder as to operate like beaters, or to force the bolls so rapidly to the end of the toothed cylinder as to prevent them from being properly ginned. I therefore do not claim the toothed cylinder in combination with such grooved cylinders, but only with those having small spiral grooves around their surfaces running nearly at right angles to the axis thereof, substantially as herein described. I am also aware that card-cylinders have been used in connection with toothed cylinders to strip off the cotton; but in such cases the advantage of delivering the cotton by a current of air directly through an opening is not attained; and I am also aware that brushes attached to the ends of the arms or fans of blowers have been used in connection with toothed cylinders to brush the cotton therefrom, to be thence passed out through an exit-mouth in the case of the blower; but in such cases the cotton, when brushed from the cylinder, is rolled and becomes knobbed on the ends of the brushes, and tends to fall upon the bottom of the case of the blower; but in my said invention the cards on the ends of the arms or fans *c* hook the cotton from the toothed cylinder and carry it forward without rolling or knobbing it, or allowing it to drop until it reaches the exit-mouth, where it is slipped off the teeth by the current of air and carried through the opening 3 to any convenient receptacle, with the fibers free from rolls and knobs. I therefore also claim the blower constructed with cards on the arms or fans, in combination with the toothed ginning-cylinder and exit-mouth, substantially as described and for the purpose set forth.

In witness whereof I have hereunto set my signature this 12th day of January, 1849.

STEPHEN R. PARKHURST.

Witnesses:
    W. SERRELL,
    LEMUEL W. SERRELL.